(12) United States Patent
Cakmakci et al.

(10) Patent No.: US 9,389,422 B1
(45) Date of Patent: Jul. 12, 2016

(54) EYEPIECE FOR HEAD WEARABLE DISPLAY USING PARTIAL AND TOTAL INTERNAL REFLECTIONS

(71) Applicant: Google Inc., Mountain View, CA (US)

(72) Inventors: Ozan Cakmakci, Sunnyvale, CA (US); Anurag Gupta, San Jose, CA (US)

(73) Assignee: Google Inc., Mountain View, CA (US)

( * ) Notice: Subject to any disclaimer, the term of this patent is extended or adjusted under 35 U.S.C. 154(b) by 58 days.

(21) Appl. No.: 14/139,277

(22) Filed: Dec. 23, 2013

(51) Int. Cl.
  *G02B 27/14* (2006.01)
  *G02B 27/01* (2006.01)

(52) U.S. Cl.
  CPC .................. *G02B 27/0172* (2013.01)

(58) Field of Classification Search
  USPC .......................................... 359/631, 630, 633
  See application file for complete search history.

(56) References Cited

U.S. PATENT DOCUMENTS

| | | | |
|---|---|---|---|
| 4,218,111 A | 8/1980 | Withrington et al. |
| 4,220,400 A | 9/1980 | Vizenor |
| 4,560,233 A | 12/1985 | Banbury |
| 4,711,512 A | 12/1987 | Upatnieks |
| 4,799,765 A | 1/1989 | Ferrer |
| 4,968,117 A | 11/1990 | Chern et al. |
| 5,050,966 A | 9/1991 | Berman |
| 5,076,664 A | 12/1991 | Migozzi |
| 5,093,567 A | 3/1992 | Staveley |
| 5,237,455 A | 8/1993 | Bordo et al. |
| 5,257,133 A | 10/1993 | Chen |
| 5,537,253 A | 7/1996 | Cox et al. |
| 5,539,422 A | 7/1996 | Heacock et al. |
| 5,654,827 A | 8/1997 | Reichert |
| 5,694,230 A | 12/1997 | Welch |
| 5,696,521 A | 12/1997 | Robinson et al. |
| 5,715,337 A | 2/1998 | Spitzer et al. |

(Continued)

FOREIGN PATENT DOCUMENTS

| | | |
|---|---|---|
| EP | 0 898 726 B1 | 3/2000 |
| EP | 0 995 145 B1 | 9/2001 |

(Continued)

OTHER PUBLICATIONS

Martinez, O.A. et al., "Thin Curved Eyepiece for See-Through Head Wearable Display", U.S. Appl. No. 14/537,780, filed Nov. 10, 2014, Whole Document.

(Continued)

*Primary Examiner* — Jack Dinh
(74) *Attorney, Agent, or Firm* — Blakely Sokoloff Taylor & Zafman LLP

(57) ABSTRACT

An eyepiece for a head wearable display includes a light guide component for guiding display light received at a peripheral location offset from a viewing region and emitting the display light in the viewing region. The light guide component includes an input surface oriented to receive the display light into the light guide component, an eye-ward facing side having a first curvature, a world facing side having a second curvature, a total internal reflection ("TIR") portion disposed proximal to the input surface to guide the display light using TIR, and a partially reflective portion disposed distal to the input surface to receive the display light from the TIR portion and guide the display light to the viewing region using partial reflections. The first and second curvatures of the eye-ward and world facing sides together operate to adjust the vergence of the display light to virtually displace an image.

20 Claims, 5 Drawing Sheets

(56) References Cited

U.S. PATENT DOCUMENTS

| | | |
|---|---|---|
| 5,771,124 A | 6/1998 | Kintz et al. |
| 5,815,126 A | 9/1998 | Fan et al. |
| 5,821,911 A | 10/1998 | Jachimowicz |
| 5,844,530 A | 12/1998 | Tosaki |
| 5,880,888 A | 3/1999 | Schoenmakers et al. |
| 5,886,822 A | 3/1999 | Spitzer |
| 5,896,232 A | 4/1999 | Budd et al. |
| 5,923,476 A | 7/1999 | Heffner |
| 5,943,171 A | 8/1999 | Budd et al. |
| 5,949,583 A | 9/1999 | Rallison et al. |
| 5,995,071 A | 11/1999 | Mertz |
| 6,005,714 A | 12/1999 | Welch |
| 6,023,372 A | 2/2000 | Spitzer et al. |
| 6,057,966 A | 5/2000 | Carroll et al. |
| 6,091,546 A | 7/2000 | Spitzer |
| 6,094,241 A | 7/2000 | Yamazaki |
| 6,111,701 A | 8/2000 | Brown |
| 6,147,807 A | 11/2000 | Droessler et al. |
| 6,172,657 B1 | 1/2001 | Kamakura et al. |
| 6,201,629 B1 | 3/2001 | McClelland et al. |
| 6,204,974 B1 | 3/2001 | Spitzer |
| 6,204,975 B1 | 3/2001 | Watters et al. |
| 6,222,677 B1 | 4/2001 | Budd et al. |
| 6,236,509 B1 | 5/2001 | Grandjean et al. |
| 6,236,511 B1 | 5/2001 | Brown |
| 6,330,118 B1 | 12/2001 | Daschner et al. |
| 6,349,001 B1 | 2/2002 | Spitzer |
| 6,349,004 B1 | 2/2002 | Fischer et al. |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,396,639 B1 | 5/2002 | Togino et al. |
| 6,462,882 B2 | 10/2002 | Chen et al. |
| 6,466,471 B1 | 10/2002 | Bhattacharyya |
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |
| 6,724,354 B1 | 4/2004 | Spitzer et al. |
| 6,738,535 B2 | 5/2004 | Kanevsky et al. |
| 6,747,611 B1 | 6/2004 | Budd et al. |
| 6,760,169 B2 | 7/2004 | Takahashi et al. |
| 6,825,987 B2 | 11/2004 | Repetto et al. |
| 6,829,095 B2 | 12/2004 | Amitai |
| 6,847,488 B2 | 1/2005 | Travis |
| 6,879,443 B2 | 4/2005 | Spitzer et al. |
| 6,961,162 B2 | 11/2005 | Nakamura et al. |
| 7,057,814 B2 | 6/2006 | Boyd et al. |
| 7,095,562 B1 | 8/2006 | Peng et al. |
| 7,119,965 B1 | 10/2006 | Rolland et al. |
| 7,145,726 B2 | 12/2006 | Geist |
| 7,158,096 B1 | 1/2007 | Spitzer |
| 7,205,960 B2 | 4/2007 | David |
| 7,210,803 B2 | 5/2007 | Matsunaga et al. |
| 7,230,766 B2 | 6/2007 | Rogers |
| 7,242,527 B2 | 7/2007 | Spitzer et al. |
| 7,391,573 B2 | 6/2008 | Amitai |
| 7,411,637 B2 | 8/2008 | Weiss |
| 7,450,310 B2 | 11/2008 | McGuire |
| 7,457,040 B2 | 11/2008 | Amitai |
| 7,542,209 B2 | 6/2009 | McGuire, Jr. et al. |
| 7,566,863 B2 | 7/2009 | Chang et al. |
| 7,576,916 B2 | 8/2009 | Amitai |
| 7,577,326 B2 | 8/2009 | Amitai |
| 7,586,686 B1 | 9/2009 | Hall |
| 7,595,480 B2 | 9/2009 | Kress |
| 7,595,933 B2 | 9/2009 | Tang |
| 7,637,617 B2 | 12/2009 | Liu et al. |
| 7,643,214 B2 | 1/2010 | Amitai |
| 7,663,805 B2 | 2/2010 | Zaloum et al. |
| 7,672,055 B2 | 3/2010 | Amitai |
| 7,715,103 B2 | 5/2010 | Sprague et al. |
| 7,724,441 B2 | 5/2010 | Amitai |
| 7,724,442 B2 | 5/2010 | Amitai |
| 7,724,443 B2 | 5/2010 | Amitai |
| 7,821,715 B2 | 10/2010 | Suzuki et al. |
| 7,843,403 B2 | 11/2010 | Spitzer |
| 7,900,068 B2 | 3/2011 | Weststrate et al. |
| 8,004,765 B2 | 8/2011 | Amitai |
| 8,212,859 B2 | 7/2012 | Tang et al. |
| 8,294,994 B1 | 10/2012 | Kelly |
| 8,336,333 B2 | 12/2012 | Ushigome |
| 8,384,999 B1 | 2/2013 | Crosby et al. |
| 8,411,365 B2 | 4/2013 | Saito |
| 8,471,967 B2 | 6/2013 | Miao et al. |
| 8,488,246 B2 | 7/2013 | Border et al. |
| 8,665,178 B1 | 3/2014 | Wang |
| 8,760,762 B1 | 6/2014 | Kelly et al. |
| 8,964,298 B2 | 2/2015 | Haddick et al. |
| 2002/0015116 A1 | 2/2002 | Park |
| 2002/0167733 A1 | 11/2002 | Roest |
| 2002/0186179 A1 | 12/2002 | Knowles |
| 2003/0090439 A1 | 5/2003 | Spitzer et al. |
| 2003/0107816 A1 | 6/2003 | Takagi et al. |
| 2004/0190150 A1 | 9/2004 | Nagaoka |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2006/0215244 A1 | 9/2006 | Yosha et al. |
| 2007/0070859 A1 | 3/2007 | Hirayama |
| 2008/0219025 A1 | 9/2008 | Spitzer et al. |
| 2008/0239422 A1 | 10/2008 | Noda |
| 2009/0067057 A1 | 3/2009 | Sprague et al. |
| 2009/0122414 A1 | 5/2009 | Amitai |
| 2010/0046070 A1 | 2/2010 | Mukawa |
| 2010/0046075 A1 | 2/2010 | Powell et al. |
| 2010/0079356 A1 | 4/2010 | Hoellwarth |
| 2010/0103078 A1 | 4/2010 | Mukawa et al. |
| 2010/0149073 A1 | 6/2010 | Chaum et al. |
| 2010/0278480 A1 | 11/2010 | Vasylyev et al. |
| 2011/0149201 A1 | 6/2011 | Powell et al. |
| 2011/0193814 A1 | 8/2011 | Gay et al. |
| 2011/0194163 A1 | 8/2011 | Shimizu et al. |
| 2011/0213664 A1 | 9/2011 | Osterhout et al. |
| 2011/0221656 A1 | 9/2011 | Haddick et al. |
| 2012/0162549 A1 | 6/2012 | Gao et al. |
| 2012/0212398 A1 | 8/2012 | Border et al. |
| 2012/0212399 A1 | 8/2012 | Border et al. |
| 2012/0249797 A1 | 10/2012 | Haddick et al. |
| 2012/0293548 A1 | 11/2012 | Perez et al. |
| 2013/0033756 A1 | 2/2013 | Spitzer et al. |
| 2013/0101253 A1 | 4/2013 | Popovich et al. |
| 2013/0127980 A1 | 5/2013 | Haddick et al. |
| 2013/0229712 A1 | 9/2013 | Kress |
| 2014/0104692 A1 | 4/2014 | Bickerstaff et al. |

FOREIGN PATENT DOCUMENTS

| | | |
|---|---|---|
| EP | 1 930 762 A1 | 6/2008 |
| EP | 1 465 003 B1 | 12/2008 |
| GB | 2 272 980 A | 6/1994 |
| JP | 2001-066543 A | 3/2001 |
| JP | 2008-122511 A | 5/2008 |
| JP | 2008-268846 A | 11/2008 |
| JP | 4550184 B2 | 9/2010 |
| WO | WO 96/05533 A1 | 2/1996 |
| WO | WO 2007/065995 A1 | 6/2007 |
| WO | WO 2009/153446 A2 | 12/2009 |
| WO | WO 2010/097439 A1 | 9/2010 |
| WO | WO 2013/112705 A1 | 8/2013 |
| WO | WO 2013/175465 A1 | 11/2013 |

OTHER PUBLICATIONS

Cakmakci, O. et al., "Head-Worn Displays: A Review", IEEE, Journal of Display Technology, vol. 2, No. 3, Sep. 2006, pp. 199-216.

Mukawa, H. et al., "8.4: *Distinguished Paper*: A Full Color Eyewear Display using Holographic Planar Waveguides", SID Symposium Digest of Technical Papers, May 2008, vol. 39, Issue 1, pp. 89-92.

Cakmakci, O. et al. "Design of a Freeform Single-Element Head-Worn Display", Proc. of SPIE vol. 7618, 761803, 2010, 6 pages.

(56) References Cited

OTHER PUBLICATIONS

Kress, B. et al., "Low Cost Replicable Plastic HUD combiner element", Photonics in the Transportation Industry: Auto to Aerospace II, Proc. SPIE vol. 7314, 73140l, Apr. 2009, 8 pages.

Kress, B. et al., "Digital combiner achieves low cost and high reliability for head-up display applications", SPIE Newsroom. DOI: 10.1117/2.1200904.1599, May 2009, 3 pages.

Kress, B. et al., "Applied Digital Optics: From Micro-optics to Nanophotonics, Chapter 5: Digital Diffractive Optics: Analytic Type", 40 pages, 2009, John Wiley & Sons, Ltd.

Kress, B. et al., "Applied Digital Optics: From Micro-optics to Nanophotonics, Chapter 12: Digital Optics Fabrication Techniques", 74 pages, 2009, John Wiley & Sons, Ltd.

Kress, B. et al., "Applied Digital Optics: From Micro-optics to Nanophotonics, Chapter 14: Replication Techniques for Digital Optics", 27 pages, 2009, John Wiley & Sons, Ltd.

Kress, B. et al., "Applied Digital Optics: From Micro-optics to Nanophotonics, Chapter 16: Digital Optics Application Pools", 60 pages, 2009, John Wiley & Sons, Ltd.

Levola, T., "Diffractive Optics for Virtual Reality Displays," Academic Dissertation, Joensuu 2005, University of Joensuu, Department of Physics, Vaisala Laboratory, 26 pages.

Kent Optronics, Liquid Crystal for Photonics, "Switchable Mirror/Switchable Glass", retrieved from Internet Dec. 16, 2013, 1 page, http://www.kentoptronics.com/switchable.html.

Martinez, M. et al., "Segmented Diffractive Optical Elements for a Head Wearable Display", U.S. Appl. No. 13/930,845, filed Jun. 28, 2013, whole document.

Kent Optronics, Inc., Liquid Crystals for Photonics, "Liquid Crystal Switchable Mirror", 2 pages, http://www.kentoptronics.com, prior to Mar. 12, 2014.

Cakmakci, O. et al., "See-Through Eyepiece for Head Wearable Display", U.S. Appl. No. 14/135,284, filed Dec. 19, 2013, whole document.

Luttmann, A.M. et al., "Eyepiece With Switchable Reflector for Head Wearable Display", U.S. Appl. No. 14/209,995, filed Mar. 13, 2014, whole document.

PCT/US2015/055110—PCT International Search Report and Written Opinion, mailed Jan. 26, 2016, 13 pages.

Surface S1

$$f(x,y) = \frac{cr^2}{\sqrt{1+\sqrt{1-c^2r^2}}} + a*x^2 + b*y^2 + c*x^2y + d*y^3 + e*x^4$$

$$+ f*x^2y^2 + g*y^4 + h*x^4y + i*x^2y^3$$

a=-0.00433    f=5.83E-006
b=-0.000216    g=8.3e-006
c=0.000105    h=-4.2E-007
d=-1.1E-005    i=-5.71E-007
e=1E-005

---

Surface S2

$$f(x,y) = \frac{cr^2}{\sqrt{1+\sqrt{1-c^2r^2}}} + a*x^2 + b*y^2 + c*x^2y + d*x^4$$

EYEPIECE FOR HEAD WEARABLE DISPLAY USING PARTIAL AND TOTAL INTERNAL REFLECTIONS

TECHNICAL FIELD

This disclosure relates generally to the field of optics, and in particular but not exclusively, relates to eyepieces for head wearable displays.

BACKGROUND INFORMATION

A head mounted display ("HMD") or head wearable display is a display device worn on or about the head. HMDs usually incorporate some sort of near-to-eye optical system to create a magnified virtual image placed a few meters in front of the user. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD typically includes some form of see-through eyepiece and can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

FIG. 4 is an appendix that provides sag equations describing surface curvatures of a demonstrative implementation of the eyepiece, in accordance with an embodiment of the disclosure.

DETAILED DESCRIPTION

Embodiments of a system and apparatus for an eyepiece of a head wearable display that leverages partial and total internal reflections are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
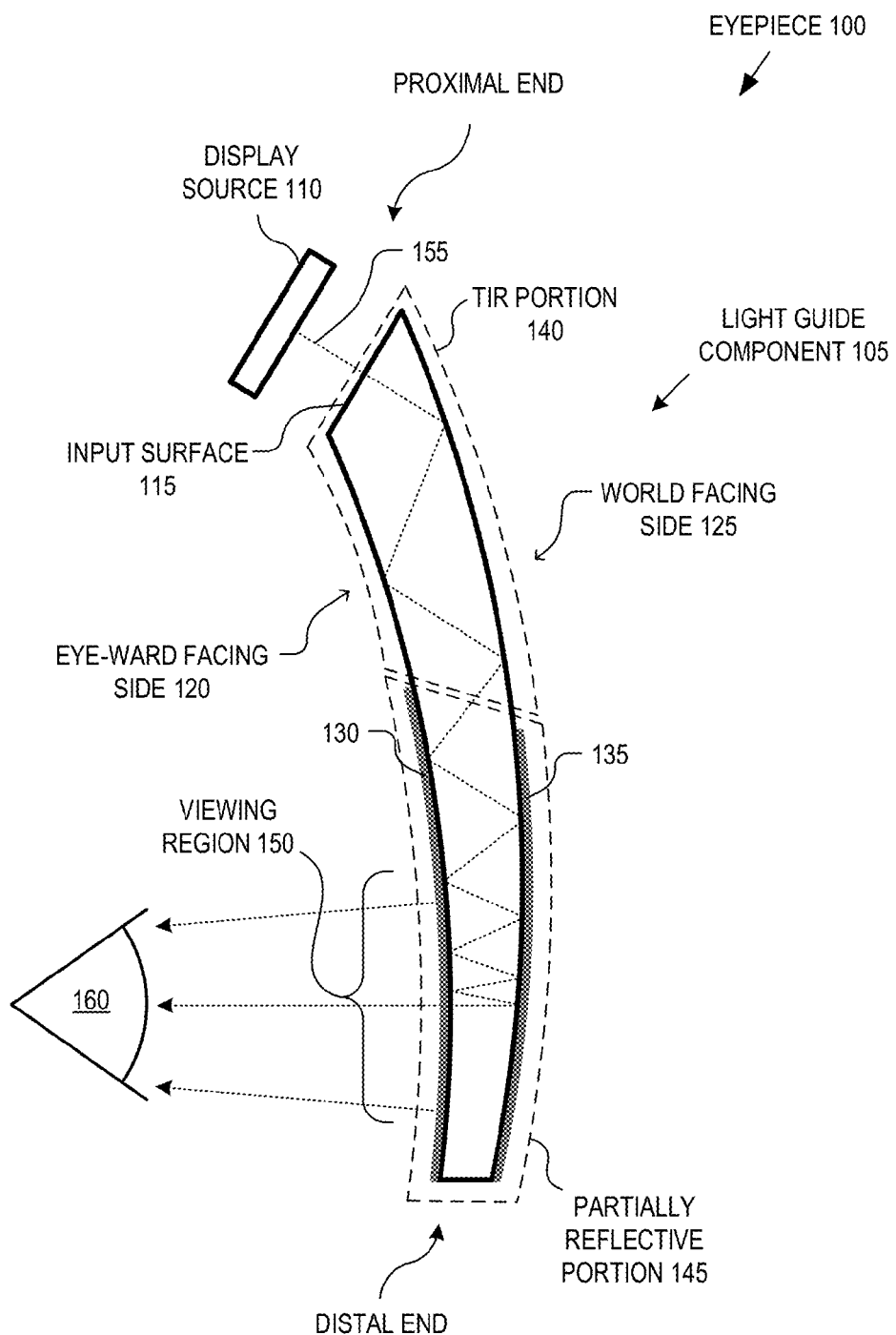
FIG. 1 is a plan view illustration of an eyepiece for a head wearable display, in accordance with an embodiment of the disclosure.

FIG. 1 is a plan view illustration of an eyepiece for a head wearable display, in accordance with an embodiment of the disclosure. The illustrated embodiment of eyepiece 100 includes a light guide component 105 and a display source 110. The illustrated embodiment of light guide component 105 includes an input surface 115, an eye-ward facing side 120, a world facing side 125, partially reflective layers 130 and 135, a total internal reflection ("TIR") portion 140, a partially reflective portion 145, and a viewing region 150.

In TIR portion 140 the light path of display light 155 is controlled such that reflections at eye-ward and world facing sides 120 and 125 are achieved via TIR. In partially reflective portion 145, the angles of incidence of the light path on eye-ward and world facing sides 120 and 125 are less than the critical angle such that TIR no longer occurs and partially reflective layers 130 and 135 are relied upon to achieve reflection. The reflections within partially reflective portion 145 are leaky, partial reflections.

Light guide component 105 is fabricated of a material having a higher index of refraction than air to induce total interface refraction ("TIR") at one or more surfaces within light guide component 105. Light guide component 105 may be fabricated of optical grade plastic (e.g., Zeonex E-330-R), glass, or otherwise. In one embodiment, the component is injection molded to shape and then processed to add various optical coatings/layers discussed below.

In the illustrated embodiment, partially reflective layers 130 and 135 are disposed on eye-ward facing side 120 and world facing side 125, respectively, within partially reflective portion 145. In another embodiment, partially reflective layer 130 and 135 may coat the entire sides including TIR portion 140, though the coatings are effectively unused along TIR portion 140 since internal reflections occur due to TIR. Partially reflective layers 130 and 135 may be implemented as a conventional beam splitter (e.g., non-polarized beam splitter film) or a polarized beam splitter ("PBS"). The splitting ratio may be selected according to design needs, but in one embodiment may be implemented as a 50/50 beam splitter. In embodiments where partially reflective layers 130 and 135 are implemented using a PBS, display source 110 would output polarized light with a polarization selected to substantially reflect off of partially reflective layers 130 and 135. A PBS design can serve to increase the efficiency of the optical system. For example, LCD or liquid crystal on silicon ("LCoS") are example display technologies that output polarized light. Of course, external polarizing films may be used in connection with other non-polarized display technologies. When operating with polarized light, it can be beneficial to use low stress materials to reduce the influence of birefringence on the optical design. Accordingly, in some embodiments, light guide component 105 may be fabricated of low stress plastics, glass, or other low stress optical grade materials.

In another embodiment, partially reflective layer 135 disposed on world facing side 125 is implemented using a switchable mirror having electrically variable transmittance/reflectance. For example, partially reflective layer 135 may be an active liquid crystal film coated along world facing side 125. The liquid crystal material is a thin film device that can rapidly switch between various transmissive and semi-transmissive/semi-reflective states in response to control signals applied to the liquid crystal film. The switchable mirror implementation provides variable reflectivity to adjust the brightness of the ambient environment and dynamically improve display contrast. In yet another embodiment, partially reflective layer 135 is implemented as a holographic mirror or reflective diffraction grating tuned to reflect the wavelength(s) of display light 155.

In one embodiment, partially reflective layers 130 and 135 have uniform reflectivity characteristic between the two layers and along their lengths extending from the proximal end closest to display source 110 and towards the distal end furthest from display source 110. In other embodiments, the reflectivity of one or both partially reflective layers 130 and 135 is non-uniform along a direction extending from the proximal end towards the distal end of eyepiece 100. This non-uniform reflectivity can be designed to increase brightness uniformity across viewing region 150. As such, in one embodiment, the reflectivity may increase towards the distal end.

During operation, display source 110 emits display light 155 from a peripheral location offset from viewing region 150 into light guide component 105. Display source 110 may be implemented using a variety of different display technologies including a liquid crystal display ("LCD"), an organic light emitting diode ("OLED") display, or otherwise. Display light 155 may include computer generated images.

Display light 155 is incident into light guide component 105 through input surface 115. In the illustrated embodiment, input surface 115 is a flat surface without optical power. In other embodiments, input surface 115 may have a curvature with optical power to apply a lensing function to display light 155.

After display light 155 enters into light guide component 105 through input surface 115, it enters into TIR portion 140. Within TIR portion 140 of light guide component 105, the angles of incidence of the optical path are such that display light 155 internally reflects off of eye-ward facing side 120 and world facing side 125 via TIR. TIR is a substantially non-lossy reflection and therefore optically efficient. In the illustrated embodiment, the initial reflection is off of world facing side 125, while a total of three TIR reflections occur within TIR portion 140. In other embodiments, two or greater TIR reflections may be implemented. Higher number of TIR reflections may be achieved by selecting materials with a high index of refraction. Higher index material brings the critical angle closer to normal and therefore TIR reflections can be sustained further along the length of light guide component 105 before partially reflective layers 130 and 135 are necessary to sustain internal reflections.

Display light 155 is guided to partially reflective portion 145 via TIR reflections within TIR portion 140. Once display light 155 enters into partially reflective portion 145, partially reflective layers 130 and 135 sustain the reflections. These reflections will typically be lossy due to the inherent nature of partially reflective coatings. However, the partially reflective layers 130 and 135 permit the incident angles to approach normal before reaching an emission area on eye-ward facing side 120 within viewing region 150. Within viewing region 150, display light 155 exits light guide component 105 along an eye-ward direction towards eye 160. In various embodiments, partially reflective portion 145 partially reflects a single ray of display light 155 four or more times between eye-ward and world facing sides 120 and 125. In the illustrated embodiment, partially reflective portion 145 partially reflects a single ray of display light 155 eight times between eye-ward and world facing sides 120 and 125

Eye-ward facing side 120 and world facing side 125 are curved surfaces with reflective optical power as display light 155 is internally reflected and refractive optical power as display light 155 is emitted towards eye 160 in viewing region 150. The curvatures of these two surfaces operate together to adjust the vergence of display light 155 with each successive reflection and the final refraction to magnify and virtually displace the image presented to eye 160 by display light 155. The image is virtually displaced back from eye 160 by a distance (e.g., 1 m to 10 m) that enables eye 160 to comfortably bring the near-to-eye image into focus. In other words, the curved sides of light guide component 105 operate to both transport display light 155 from a peripheral location to viewing region 150 while simultaneously collimating, or nearly collimating, the image without a separate or additional collimating lens between display source 110 and light guide component 105. This design reduces the number of optical components and reduces fabrication and assembly complexity. FIG. 4 presents example sag equations with coefficient values specifying example curvatures for eye-ward facing side 120 (surface S1) and world facing side 125 (surface S2). Of course, other curvatures may be implemented.

In one embodiment, both eye-ward facing side 120 and world facing side 125 are clear surfaces that reflect display light 155 via TIR in TIR portion 140 and via partially reflective layers 130 and 135 in partially reflective portion 145. Clear surfaces achieve a desirable industrial design characteristic, since eyepiece 100 will appear as a clear eyepiece to external observers. Eyepiece 100 further achieves desirable industrial design characteristics with the thickness between eye-ward and world facing sides 120 and 125 ranging between 1 mm to 5 mm thick. The illustrated design can provide a 15 degree of diagonal field of view ("FOV") with an eyebox of about 10 mm and an eye relief of about 19.4 mm. Of course, other dimensions can be achieved.

Figure 2:
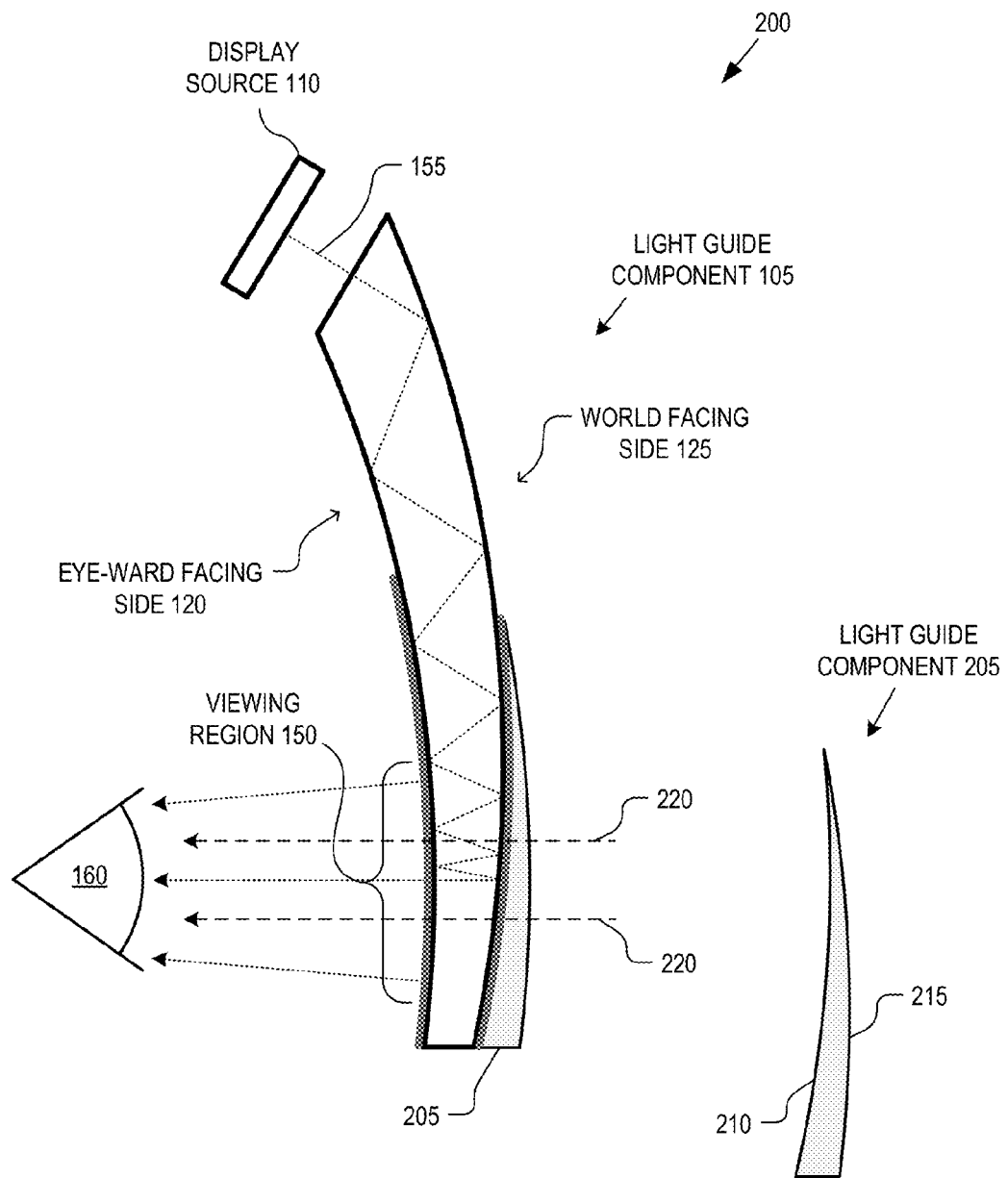
FIG. 2 is a plan view illustration of a see-through eyepiece including an add-on component for a head wearable display, in accordance with an embodiment of the disclosure.

FIG. 2 is a plan view illustration of a see-through eyepiece 200 including an add-on component for a head wearable display, in accordance with an embodiment of the disclosure. See-through eyepiece 200 is similar to eyepiece 100, except for the addition of see-through add-on component 205 in front of world facing side 125 in at least viewing region 150. The illustrated embodiment of add-on component 205 includes an interface surface 210 and external facing surface 215. In one embodiment, add-on component 205 may substantially cover the entire partially reflective portion 145 of light guide component 105.

In one embodiment, light guide component 105 and add-on component 205 are fabricated as two independent pieces that are bonded together along world facing side 125 and interface surface 210 using a clear adhesive. Light guide component 105 and add-on component 205 may be fabricated of two different materials having the same index of refraction, or both of the same material. For example, light guide component 105 and add-on component 205 both may be fabricated of optical grade plastic (e.g., Zeonex E-330-R), glass, or otherwise. In one embodiment, the components are injection molded to shape, processed to add various optical coatings/ layers (e.g., partially reflective layers 130 and 135, anti-fingerprint coatings, etc.), and then bonded together.

Since partially reflective layers 130 and 135 are only partially reflective and light guide component 105 and add-on component 205 are fabricated of optically transmissive materials (e.g., clear plastic), viewing region 150 permits at least a portion of external scene light 220 to pass through to eye 160. Thus, see-through eyepiece 200 operates as an optical combiner, which combines external scene light 220 with display light 155 emitted through viewing portion 150 along an eye-ward direction into eye 160. In this way, eyepiece 200 is capable of displaying an augmented reality to eye 160.

As illustrated, add-on component 205 is bonded onto light guide component 105 in viewing region 150. Interface surface 210 of add-on component 205 is designed with a curvature that smoothly mates to the curvature of world facing side 125 of light guide component 105. Furthermore, add-on component 205 is designed with a curved prism or curved wedge shape that forms a smooth, continuous outer surface that includes world facing side 125 and external facing side 215. In one embodiment, the first, second, and third derivatives of the curvatures of both world facing side 125 and external facing surface 215 are controlled to achieve a smooth and continuous transition at the junction between world facing side 125 and external facing surface 215.

As mentioned above, add-on component 205 and light guide component 105 are fabricated of material(s) having the same or similar index of refraction. This serves to remove optical power at the junction between world facing side 125 and interface surface 210 for external scene light 220 that passes through viewing region 150 to eye 160. Additionally, the curvature of external scene facing surface 215 is complementary to eye-ward facing side 120 to counter-act the refractive lensing of eye-ward facing side 120. In short, the input angle of external scene light 220 entering external scene facing surface 215 is substantially equivalent to the output angle of external scene light 220 exiting eye-ward facing side 120. As such, eyepiece 200 passes at least a portion of external light 160 through viewing region 150 substantially without lensing, thereby permitting the user to have a substantially undistorted view of the ambient environment in front of eyepiece 200.

In one embodiment, the surfaces of eyepiece 100 (or 200) at which the optical path of display light 155 is redirected via TIR are coated with anti-fingerprint coatings. For example, in one embodiment, both eye-ward and world facing sides 120 and 125 in TIR portion 140 are coated with an anti-fingerprint coating to reduce the impact of fingerprint oils on total internal reflection at these surfaces. Anti-fingerprint coatings are known in the art.

Figure 3A:
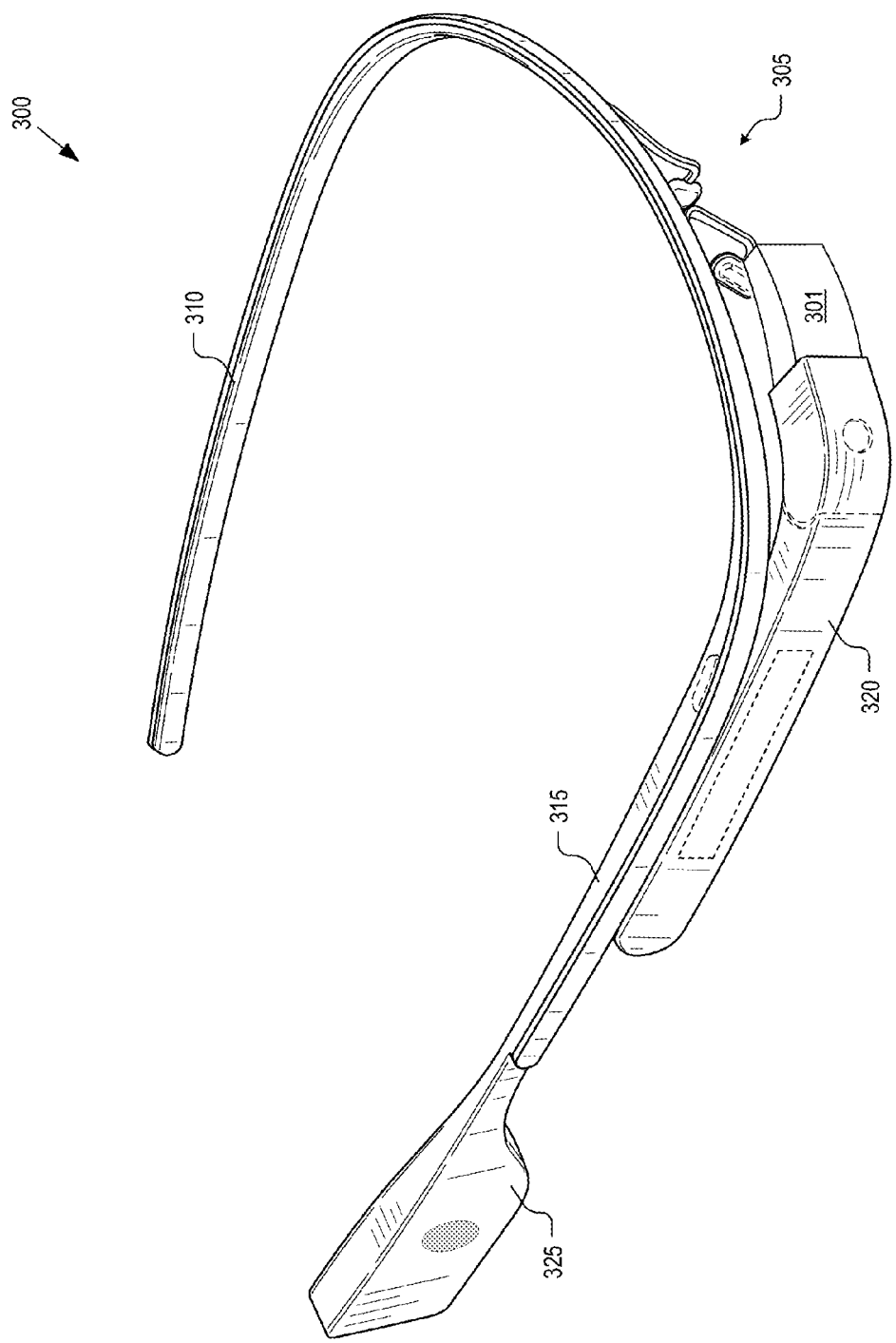
FIGS. 3A and 3B illustrate a demonstrative head wearable display including an eyepiece, in accordance with an embodiment of the disclosure.
Figure 3B:
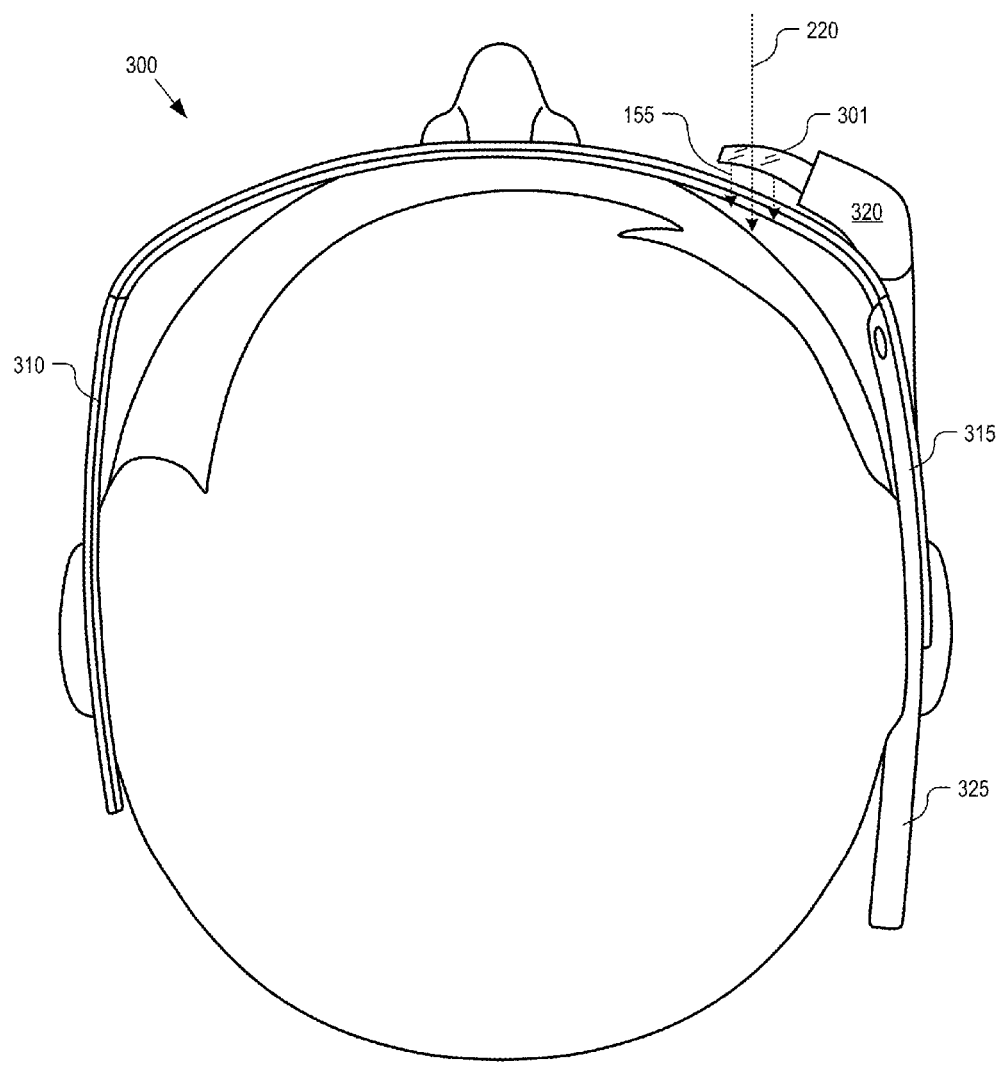

FIGS. 3A and 3B illustrate a monocular head wearable display 300 using an eyepiece 301, in accordance with an embodiment of the disclosure. FIG. 3A is a perspective view of head wearable display 300, while FIG. 3B is a top view of the same. Eyepiece 301 may be implemented with embodiments of eyepieces 100 or 200 as discussed above. Eyepiece 301 is mounted to a frame assembly, which includes a nose bridge 305, left ear arm 310, and right ear arm 315. Housings 320 and 325 may contain various electronics including a microprocessor, interfaces, one or more wireless transceivers, a battery, a camera, a speaker, etc. Although FIGS. 3A and 3B illustrate a monocular embodiment, head wearable display 300 may also be implemented as a binocular display with two eyepieces 301 each aligned with a respective eye of the user when display 300 is worn.

The see-through piece 301 is secured into an eye glass arrangement or head wearable display that can be worn on the head of a user. The left and right ear arms 310 and 315 rest over the user's ears while nose bridge 305 rests over the user's nose. The frame assembly is shaped and sized to position viewing region 150 in front of an eye of the user. Other frame assemblies having other shapes may be used (e.g., traditional eyeglasses frame, a single contiguous headset member, a headband, goggles type eyewear, etc.).

The illustrated embodiment of head wearable display 300 is capable of displaying an augmented reality to the user. In see-through embodiments, eyepiece 301 permits the user to see a real world image via external scene light 220. Left and right (binocular embodiment) display light 155 may be generated by display sources 110 mounted in peripheral corners outside the user's central vision. Display light 155 is seen by the user as a virtual image superimposed over external scene light 220 as an augmented reality. In some embodiments, external scene light 220 may be fully, partially, or selectively blocked to provide sun shading characteristics and increase the contrast of image light 155 via tinting add-on component 205.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece for a head wearable display, the eyepiece comprising:
    a light guide component for guiding display light received at a peripheral location offset from a viewing region and emitting the display light along an eye-ward direction in the viewing region, the light guide component including:
        an input surface oriented to receive the display light into the light guide component at the peripheral location;
        an eye-ward facing side having a first curvature;
        a world facing side having a second curvature different from the first curvature;
        a total internal reflection ("TIR") portion disposed proximal to the input surface to guide the display light received through in the input surface using TIR off of the eye-ward and world facing sides; and
        a partially reflective portion disposed distal to the input surface to receive the display light from the TIR portion and guide the display light to the viewing region using partial reflections off of the eye-ward and world facing sides,
    wherein the first and second curvatures of the eye-ward and world facing sides together operate to adjust the vergence of the display light via successive reflections between the eye-ward and world facing sides to virtually displace an image of the display light emitted,
    wherein an optical path of a single ray of the display light within the light guide component includes two or more TIR reflections within the TIR portion and four or more partial reflections within the partially reflective portion.

2. The eyepiece of claim 1, wherein the light guide component further comprises:
   partially reflective layers disposed on the eye-ward facing and world facing sides within the partially reflective portion.

3. The eyepiece of claim 2, wherein the partially reflective layers comprise partially reflective coatings.

4. The eyepiece of claim 3, wherein the partially reflective coatings comprise polarized beam splitter ("PBS") coatings.

5. The eyepiece of claim 2, wherein the one of the partially reflective layers disposed on the world facing side comprises a switchable mirror.

6. The eyepiece of claim 2, wherein the reflectivity of one or both of the partially reflective layers is non-uniform along a direction extending from a proximal end to a distal end of the light guide component.

7. The eyepiece of claim 2, wherein the one of the partially reflective layers disposed on the world facing side comprises a holographic mirror.

8. The eyepiece of claim 1, wherein the optical path includes three TIR reflections within the TIR portions and eight partial reflections within the partially reflection portion.

9. The eyepiece of claim 1, further comprising:
   a see-through add-on component mounted to the world facing side of the light guide component in the viewing region,
   wherein the see-through add-on component and the light guide component are at least partially transparent to external scene light travelling along the eye-ward direction.

10. The eyepiece of claim 9, wherein the see-through add-on component is formed of a material having an index of refraction substantially equivalent to that of the light guide component.

11. The eyepiece of claim 9, wherein the see-through add-on component comprises:
   an interface surface having a third curvature that mates to the second curvature of the world facing side in the viewing region; and
   an external facing surface having a fourth curvature that is complementary to the first curvature of the eye-ward facing side in the viewing region to substantially offset optical power of the eye-ward facing side in the viewing region for the external scene light.

12. The eyepiece of claim 1, wherein the input surface comprises a flat surface.

13. The eyepiece of claim 1, wherein the eye-ward and world facing sides are coated with anti-fingerprint coatings along the TIR portion.

14. A head wearable display for displaying an image to a user, the head wearable display comprising:
   a display source to generate display light;
   an eyepiece to guide light, the eyepiece including:
      an input surface oriented to receive the display light into the light guide component at a peripheral location offset from a viewing region of the eyepiece;
      an eye-ward facing side having a first curvature;
      a world facing side having a second curvature different from the first curvature;
      a total internal reflection ("TIR") portion disposed proximal to the input surface to guide the display light received through in the input surface using TIR off of the eye-ward and world facing sides; and
      a partially reflective portion disposed distal to the input surface to receive the display light from the TIR portion and guide the display light to the viewing region using partial reflections off of the eye-ward and world facing sides, wherein an optical path of a single ray of the display light within the eyepiece includes two or more TIR reflections within the TIR portion and four or more partial reflections within the partially reflective portion; and
   a frame assembly to support the eyepiece and the display source for wearing on a head of the user with the viewing region positioned in front of the eye of the user.

15. The head wearable display of claim 14, further comprises:
   partially reflective layers disposed on the eye-ward facing and world facing sides within the partially reflective portion.

16. The head wearable display of claim 15, wherein the partially reflective coatings comprise polarized beam splitter ("PBS") coatings.

17. The head wearable display of claim 15, wherein the one of the partially reflective layers disposed on the world facing side comprises a switchable mirror.

18. The head wearable display of claim 15, wherein the reflectivity of one or both of the partially reflective layers is non-uniform along a direction extending from a proximal end to a distal end of the light guide component.

19. The head wearable display of claim 14, further comprising:
   a see-through add-on component mounted to the world facing side in the viewing region,
   wherein the see-through add-on is at least partially transparent to external scene light travelling along the eye-ward direction.

20. The head wearable display of claim 19, wherein the see-through add-on component comprises:
   an interface surface having a third curvature that mates to the second curvature of the world facing side in the viewing region; and
   an external facing surface having a fourth curvature that is complementary to the first curvature of the eye-ward facing side in the viewing region to substantially offset optical power of the eye-ward facing side in the viewing region for the external scene light.

* * * * *